UNITED STATES PATENT OFFICE.

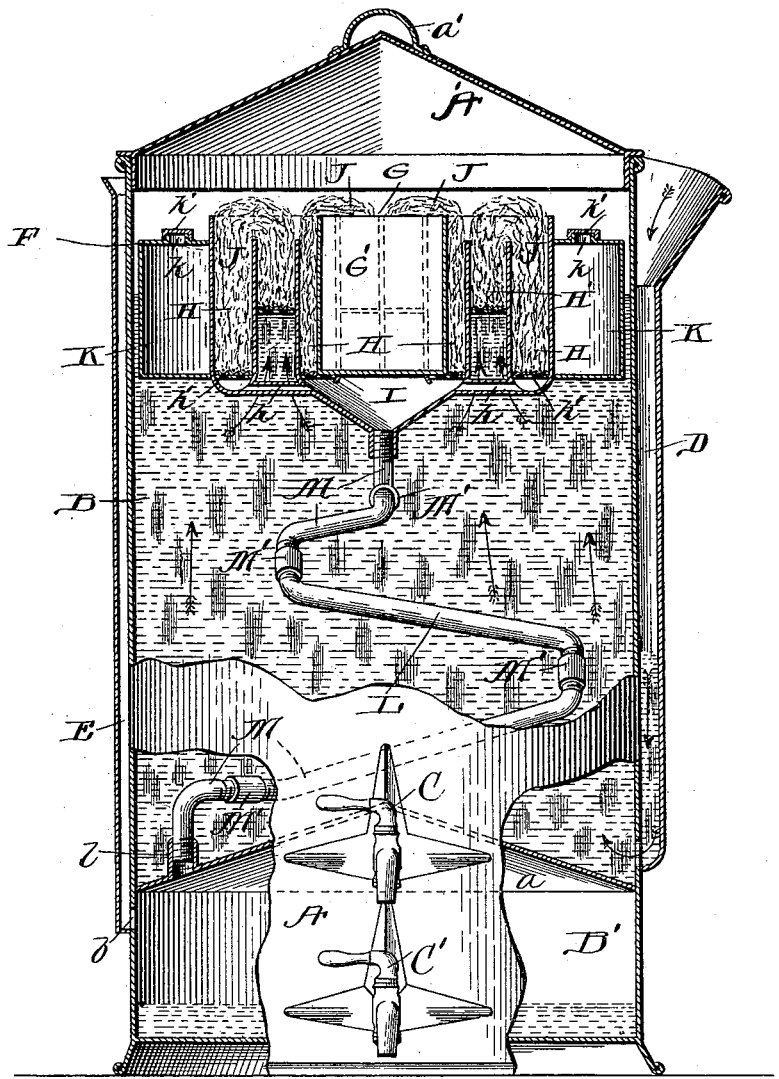

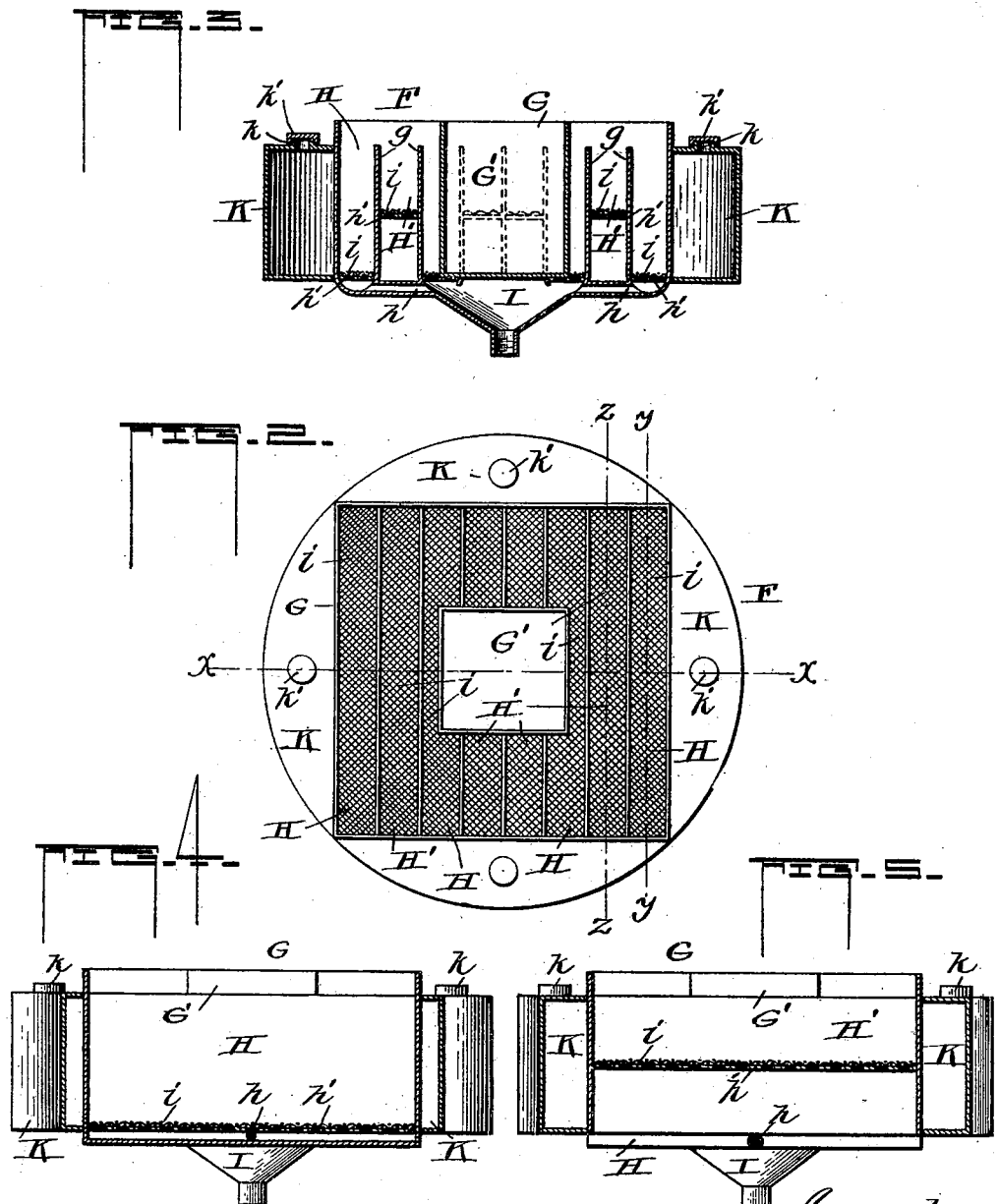

CHARLES L. CHARVAT, OF PEORIA, ILLINOIS.

FILTER.

SPECIFICATION forming part of Letters Patent No. 621,899, dated March 28, 1899.

Application filed June 25, 1898. Serial No. 684,486. (No model.)

*To all whom it may concern:*

Be it known that I, CHARLES L. CHARVAT, a citizen of the United States, residing at Peoria, in the county of Peoria and State of Illinois, have invented certain new and useful Improvements in Filters; and I do hereby declare that the following is a full, clear, and exact description of the invention, which will enable others skilled in the art to which it appertains to make and use the same.

My invention relates to certain new and useful improvements in filters, by means of which a filter is provided being simple in construction, durable and cheap, and well adapted for the purpose designed.

More particularly my invention relates to a filter adapted in its construction to practically apply the principles of capillary attraction in performing its filtering function.

My invention consists, essentially, of the provision, in connection with a reservoir or tank divided into compartments, of a floating case or vat constructed to contain absorbent material and to provide for sufficient buoyancy to enable the same to float upon the liquid in the reservoir, of a series of compartments suitably constructed for containing the absorbent materal, alternating compartments from either side adapted to receive the fluid, passing the same to the next compartment adjoining and off to its receiving-receptacle, of a series of air-chambers surrounding the said compartments, of a suitable duct leading from said float or vat, the said duct composed of folding sections, and of certain other details of construction hereinafter more fully described, and pointed out in the drawings.

That my invention may be more fully understood reference is had to the accompanying drawings, in which—

Figure 1 is a vertical section through the center of the filter, showing the construction and relative positions of the various parts. Fig. 2 is a plan of the floating case or vat. Fig. 3 is a section on the line X X, Fig. 2. Fig. 4 is a section on the line Y Y, Fig. 2. Fig. 5 is a section on the line Z Z, Fig. 2.

In the figures like letters of reference indicate the several corresponding parts on the drawings.

A refers generally to the main tank or reservoir, which is divided into two compartments B and B' by the partition $a$. The said reservoir being provided with the lid or cover A', which fits snugly in the top of the reservoir, and $a'$ is a handle suitably secured to the lid. Faucets C and C' are provided for the compartments B and B', respectively, and are for the purpose of drawing off the liquid from either the upper or the lower compartments, the upper purposed to retain the liquid to be filtered and the lower the filtered liquid.

D is an inlet-duct for the liquid, secured to the main tank, as shown, and has the upper expanded or funnel-shaped portion, the lower portion thereof extending almost to the bottom of compartment B, a perforation being shown in the tank communicating with the duct to admit the liquid to flow therein.

E is an air-tube somewhat similar to the duct D and is suitably attached to the tank and admits air into the lower compartment B' through the aperture $b$, as shown.

F is a float and filtering-vat combined adapted to bear around the inner wall of the case A and within the compartment B.

G as a whole designates the filtering-vat, being provided with the centrally-disposed compartments G', its further purpose being hereinafter described.

H and H' are a series of compartments or pockets suitably arranged within the filtering-vat and may be placed at equal distances apart, as shown, or may be placed in any desired manner most suitable. The pockets are suitably divided from each other by the partitions $g$.

The pockets H and H' differ somewhat in their general formation, although of the same width, yet in their depth there is a perceptible difference for a purpose to be described. The pockets H extend the full depth of the vat and are provided with a rounded bottom which extends below the vat, and the pockets H', which are much shallower than the pockets H adjoining, extend to a point about central of the vat, it being purposed when filtering to have the lower half of the float submerged in the liquid sufficiently to allow the bottoms of the pockets H' to contact with the liquid.

I is a funnel-shaped receiving-reservoir centrally disposed beneath the vat and is provided with an extension suitable to have attached thereto a tube or duct for carrying off the fluid. This reservoir connects direct with the centrally-disposed pockets H and with those carried at the farther side by the tubes $h$, as shown in the drawings. Each of the said pockets H and H' is provided with the foraminated bottoms $h'$, those in the outside pockets H being carried just above the aperture to the tubes $h$, and bearing upon the foraminated bottoms $h'$ is carried a much finer sieve, (designated as $i$,) and are removably placed in said pockets.

J is an absorbent material, as cotton or like substance, having a capillary consistency, which absorbent material is packed within the pocket H' in such a manner as to occupy the space between the partitions $g$ and is caused to bear over the edges of the partitions into the pockets H and down to the bottom thereof or to the sieves $i$, thus providing a siphon-formed body of absorbent material.

Carried around the filtering-vat I have provided a series of air-chambers or floats K, carrying the filtering-vat on the surface of the liquid. These chambers are provided with the openings $k$ and having suitable caps or covers $k'$ for closing the same. The object of these openings and caps is to provide a means for insuring the float and vat sinking a sufficient depth into the liquid that it may contact with the absorbent material in the pockets H'. This may be accomplished by pouring a liquid into the chamber K, causing the same to sink into the liquid. The compartment G' is also provided to assist to this end, which may be done by placing weights or any suitable material in the bottom of the same. As the float in itself is very light, without assistance of the character above described, the absorbent material would hardly contact with the liquid.

L is a tube or a series of joined sections of pipe connected to the extension from the reservoir I at one extremity and connected with the tube $l$, projecting upwardly from the partition $a$, which divides the reservoir into the compartments B and B', as shown in Fig. 1. This tube L is composed of the sections M, which are joined together by the joints M' and are carried within the compartment B, purposed when the float and vat are at the top of the compartment to extend itself, and when the float begins to descend as the fluid is filtered to fold up and to finally lay itself upon the partition $a$.

In applying my filter for practical use, the several parts thereof having been arranged in the main compartment substantially in the manner shown in the drawings, the liquid is poured into the inlet-duct D and passing down enters into the lower part of compartment B. The case, as shown in the drawings, comprising the vat and float, is caused to float upon the surface of the liquid, as is shown in Fig. 1. The pockets, as have already been described, being filled with the absorbent, the liquid will be conducted, as shown by the arrows, through the foraminated bottoms in the pockets H', through the absorbent material, and from thence through the foraminated bottoms of the pockets H, insuring the liquid to be thoroughly filtered before passing into the reservoir I, and from thence into the tube L, and into the compartment B'. As the float is caused to sink to the bottom, the folding sections of the duct L are brought together and the vat settles down into the bottom of the compartment.

It is desirable when the weather is such as to cause any liquid being filtered, as oil, to become thick, which would have a tendency to retard the capillary action of the filter, and while I have shown no means for heating the same, usually provided in all filters of this class, yet a steam-coil may be provided and means for receiving steam therefrom adapted to warm the body of the oil and render the same susceptible to capillary action.

Having thus fully described my invention, what I claim, and desire to secure by Letters Patent, is—

1. In a filter, a buoy or float carried therein and provided with a series of air-chambers surrounding said float adapted to float the same on the body of the liquid, a centrally-disposed compartment therein, a series of pockets separated by thin partitions, each adjoining pocket being shallower than that of its mate and carrying a capillary-acting absorbent material adapted to receive the liquid and deliver it to its adjoining pocket, and a reservoir beneath the float and integral therewith receiving the filtered fluid through suitable tubes and delivering the same into a separate receptacle, all substantially as herein described and shown.

2. In a filter having one or more compartments, a filtering-vat suitably carried in one of said compartments and adapted to filter the liquid contained therein, a series of pockets arranged at intervals therein and surrounded by air-chambers adapted to maintain the same on the body of the liquid, the pockets extending the full depth of said vat and having suitable tubes connecting the same with a centrally-disposed reservoir beneath said vat and depending therefrom, the pockets shown substantially shallower than the adjoining pockets adapted to receive the liquid and deliver the same to its adjoining pocket through suitable absorbent material carried therein the same passing from thence into the reservoir, and a duct composed of a series of jointed sections connecting said reservoir with a separate receptacle or compartment in said filter, all substantially as and for the purpose set forth.

3. In a filter the combination with a receptacle for containing liquid, of a buoy or float having a centrally-disposed compartment therein and suitable air-chambers for assisting in maintaining the said float upon the surface of the liquid, a series of longitudinally-arranged pockets in said float, each alternate pocket from opposite sides of the float extending the full depth of the same and provided with rounded bottom portions extending below the same, each of said pockets having an adjoining pocket extending to a point about central of the float carrying suitable capillary-acting absorbent material which bears over into the adjoining pocket purposed when the float is partially submerged to receive the liquid and deliver the same thereto, a folding duct made in sections and joined by suitable joints and suitably connected with said float adapted to receive the liquid from the pockets through suitable intermediate ducts and purposed to convey the filtered liquid to a separate receptacle or compartment in said filter, all substantially as herein shown and described.

4. In a filter, the combination with a receptacle for containing liquid, of a buoy or float consisting of a pan suitably divided into a series of pockets, a series of air-chambers surrounding said pan and pockets adapted to cause the same to float on the body of the liquid and a duct leading from said pan to a separate receptacle and made in sections adapted to be folded together as the float lowers to the bottom of the receptacle, a capillary-acting absorbent material carried in said pockets, suitable foraminated bottoms with removably-carried sieves for said pockets and the means for conveying the liquid from said pockets to the folding duct, all substantially as and for the purpose set forth.

5. In a filter, a buoy or float carried upon the surface of the liquid contained in the filter-receptacle, a series of pockets suitably arranged in said buoy, each alternating pocket being the full depth of the buoy while its adjoining pocket extends but a portion of the way in the buoy, foraminated bottoms in each pocket and a removably-carried sieve covering said bottoms, the arrangements of the pockets being such that the liquid will be conducted into the shallower pockets through the absorbent material and through suitable tubes into a reservoir centrally disposed on the bottom of said buoy, a folding duct consisting of a number of jointed sections connected to said reservoir for conducting the filtered liquid to a separate compartment, all substantially as and for the purpose set forth.

6. In a filtering-vat, the combination therewith, of a series of air-chambers surrounding the same for maintaining the vat on the body of the liquid, the filtering-pockets H, and H'; the pockets H', being much shallower than the pockets H, and adapted to carry suitable capillary-acting absorbent material and purposed to receive and deliver the liquid to the pockets H, the laterally-extending tubes $h$, from the pockets H, communicating the same with a reservoir I, and the sectional duct L, depending from the reservoir and communicating the same with a suitable receptacle adapted to deliver the filtered liquid from the reservoir thereto, all substantially as herein shown and described.

In testimony whereof I affix my signature in presence of two witnesses.

CHARLES L. CHARVAT.

Witnesses:
F. A. GORDON,
CHAS. W. LA PORTE.